Patented Mar. 20, 1951

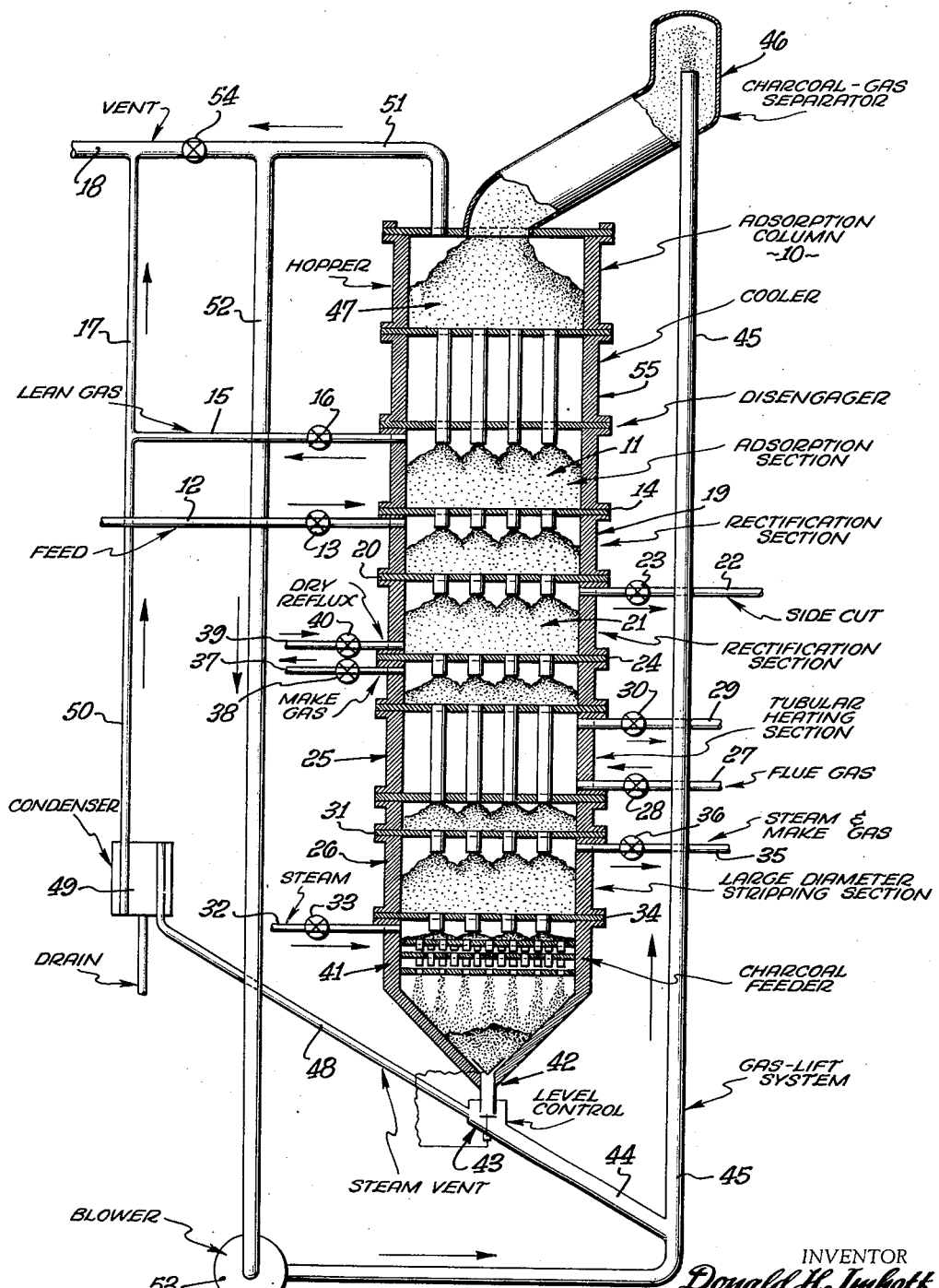

2,545,850

UNITED STATES PATENT OFFICE 2,545,850

ADSORPTION PROCESS AND APPARATUS

Donald H. Imhoff, Long Beach, Calif., assignor to Union Oil Company of California, Los Angeles, Calif., a corporation of California Application November 26, 1945, Serial No. 630,905

22 Claims. (Cl. 183—4.5)

This invention relates to the separation of gaseous mixtures by selective adsorption of certain of the components of such mixtures on solid adsorbents and applies particularly to the separation of gaseous mixtures comprising hydrocarbons by selective adsorption on granular charcoal.

Gaseous mixtures containing valuable hydrocarbons in admixtures with flue gases in large amounts are encountered in many processes, such as for example cracking process for the production of low boiling hydrocarbons. Modifications of conventional adsorption processes can be used to extract the bulk of the normally liquid hydrocarbons and even a large proportion of the $C_4$ hydrocarbons, but it is generally uneconomical to operate at sufficiently high pressures or sufficiently low temperatures to recover any substantial proportion of the $C_2$ and $C_3$ hydrocarbons, which may contain a high proportion of potentially valuable olefins, such as ethylene, propylene, acetylene, and the like, which are either wasted or employed as low-value fuel gas. The present process is particularly applicable to the separation of normally gaseous mixtures and particularly gaseous mixtures of hydrocarbons containing five carbon atoms or less.

It is known that certain solid adsorbents such as for example activated charcoal or silica gel will adsorb some gases such as water vapor, benzene vapor, butane and the like more readily than they will other gases, such as hydrogen, nitrogen, methane and the like, and that by heating the enriched adsorbent containing the adsorbed gases these gases may be liberated substantially completely and the adsorbents after being cooled again are capable of further selective adsorption. This has led to the development of various processes for the separation of gases involving adsorption on solid adsorbents, heating the enriched adsorbents to liberate the adsorbed gases and cooling the thus regenerated adsorbent for further use. The present invention involves a process of this type which constitutes an improvement over any previous process described in that it affords greater efficiency of separation as well as greater simplicity and economy of operation.

In general the process of separating gaseous mixtures by selective adsorption on a granular adsorbent involves the steps of countercurrently adsorbing certain components of the gaseous mixtures in a bed of charcoal, or other adsorbent, preferably in a moving bed of charcoal, the enriched or saturated charcoal flowing from the adsorption zone through one or more rectification zones as hereinafter described and into a stripping section wherein the gaseous components are desorbed from the charcoal by means of heat and steam or other stripping gas. From the stripping section the charcoal passes through a sealing leg into a conveying system wherein it is carried to the top of the adsorber and from thence through a cooling section back into the adsorbing section to complete the cycle. Various modifications may be employed which are described in greater detail hereinafter.

Thus in the conventional process of selective adsorption, a gaseous fraction such as a hydrocarbon fraction is divided into two separate fractions, one enriched in higher molecular weight components and the other enriched in the lower molecular weight components, the former being obtained as the adsorbate from the stripping section and the latter, passing through the adsorption section, being preferentially desorbed by the higher molecular weight components.

In a recent improvement in the art of selective adsorption and separation of gases, the adsorption column has been provided with two or more rectification sections whereby it is possible through the usage of refluxing to obtain from a gaseous fraction not only a lean gas and an adsorbate by one or more heart cuts, i. e. fractions of relatively narrow boiling range separated from a wide boiling range hydrocarbon fraction. In the resolution of a normally gaseous hydrocarbon fraction containing for example $C_1$, $C_2$, $C_3$, and $C_4$ olefins in a conventional selective adsorption process employing a solid granular adsorbent, it is possible to resolve two components; one enriched in the higher molecular weight hydrocarbons and the other enriched in the lower molecular weight hydrocarbons, the dividing point being a function of the ratio of charcoal and feed stock, charcoal flow rate, and the like. In the improved heart cutting process, the heavier components such as $C_2$, $C_3$, and $C_4$ paraffins and olefins are adsorbed by the solid adsorbent in an adsorption section of the column, the adsorbent thereafter passing through a number of rectifying sections wherein it is subjected to a reflux of $C_3$, and $C_4$ hydrocarbons, for example, which reflux has the effect of desorbing the $C_2$ paraffins and olefins which may be removed from the column by appropriate means as a heart cut from the wider range feed stock.

Independent of which of these processes is employed it is necessary to strip the residual hydrocarbons from the adsorbent by means of high temperature heat treatment in the presence of a stripping gas. Heretofore this stripping has been accomplished either countercurrently in a tubular stripping section wherein the charcoal flows through tubes which are heated externally by means of hot flue gases or the like while steam or other stripping gas flows countercurrently to the adsorbent through the heated tubes, or alternatively the adsorbent may be stripped in the process of conveyance back to the initial stages of the operation. Either of these processes possess inherent disadvantages paramount among which is the limitation of the amount of stripping gas which may be employed as a result of the diminished effective diameter of flow of the adsorbent through either a tubular stripping section or a gas lift conveyance system. The effect of the limitation of the quantity of stripping gas which may be employed is to increase the required temperature of stripping in order to obtain satisfactory removal of the hydrocarbons from the adsorbent inasmuch as this removal is a function of the two variables of temperature and quantity of stripping gas. Thus the lower the permissible rates of stripping gas the higher the required temperatures for a given degree of stripping and the higher these temperatures the shorter will be the effective life of the adsorbent due to increased polymerization, etc., of the hydrocarbons present on the adsorbent.

It is an object, therefore, of the present invention to provide an improvement in the art of selective adsorption and more particularly an improvement in the efficiency and economy of the stripping of the adsorbed components of the gaseous feed from the adsorbate.

Correlatively, it is a further object of my invention to provide an apparatus for the selective adsorption and separation of gaseous mixtures wherein the recovery of adsorbed components from the adsorbent is accomplished more efficiently and economically than has been heretofore possible. These objects are attained according to the present invention through the usage of a new type of stripping section so designed as to permit exceedingly high rates of stripping gas flow with a corresponding reduction of required stripping temperatures. The usage of higher rates of stripping gas flow is made possible by the inclusion in the stripping zone of the adsorption process of an additional section beneath the externally heated tubular section which additional section provides substantially the same cross-sectional diameter of effective charcoal flow as the adsorption and rectification sections of the system, thus permitting usage of stripping gas rates greatly above those possible through the tubular stripping section.

In the conventional tubular stripping section the cross-sectional diameter of adsorbent flow may range from as low as 20% to not more than 50% of the diameter of flow in the adsorption and rectification zones of the apparatus. This restriction in flow diameter is necessary in order to permit the effective heating of the charcoal by means of flue gas or the like, but at the same time this restriction reduces the quantity of stripping gas which may be used proportionately to the degree of restriction. By the addition of a larger diameter stripping section beneath the tubular section into which the adsorbent, heated in the tubular section, flows, it is possible to put through this lower section, having a flow diameter substantially equal to that of the adsorption and rectification zones, a quantity of stripping gas from 100% to 500% greater than through the tubular section. Thus stripping gas such as steam is introduced in the lower portion of this additional section by means of a suitable engager such as a tube bundle or the like, is caused to flow through this section countercurrently to the adsorbent and the major portion of the stripping gas is removed from the upper portion of the section while a relatively small portion is allowed to continue upwardly through the tubes of the tubular section of the stripping zone.

The present invention may be more readily understood by reference to the drawing in which apparatus is shown in vertical cross section wherein the selective adsorption of a gaseous mixture may be accomplished. Such an apparatus may be employed for the separation of any gaseous mixture by selective adsorption on a suitable adsorbent such as granular charcoal and for the sake of convenience the process will be described in relation to the separation of a gaseous mixture comprising $C_1$, $C_2$, $C_3$ and $C_4$ paraffins and $C_2$, $C_3$ and $C_4$ olefins which may or may not contain small amounts of lighter and heavier gases.

Referring to the drawing, the feed gas is introduced to the adsorption section 11 of adsorption column 10 by means of line 12 controlled by valve 13 and is distributed within the adsorption section 11 by means of disengager 14. A solid bed of granular charcoal is caused to flow downwardly through the adsorption column at such a rate in relation to the feed rate that substantially all of the ethane, ethylene and heavier hydrocarbons are adsorbed by the charcoal in the adsorption section 11 while the methane and any lower boiling gases which may be present pass upwardly therein and may be withdrawn from the adsorption section by means of line 15 controlled by valve 16 passing through line 17 into the vent line 18. Alternatively and by means of valve 16, the amount of lean gas withdrawn from adsorption section 11 may be controlled so as to force the passage of a portion of the lean gas through the tubes of the cooling section immediately above as hereinafter described.

The saturated charcoal passes from adsorption section 11 through disengager 14 into the rectification section 19 wherein equilibrium is established between the methane and lighter gases which may have been adsorbed, and the $C_2$ and heavier hydrocarbons by refluxing the charcoal with $C_2$ hydrocarbons which are desorbed from the charcoal at a point lower in the column. Thus, in the rectification section 19, any residual methane or lighter gases which may have been adsorbed by the charcoal passing downwardly through disengager 14 are desorbed by virtue of the selective adsorption exhibited by the charcoal for the $C_2$ hydrocarbons in relation to the methane which are caused to pass upwardly through disengager 20 into rectification section 19. The desorbed methane and lighter gases then pass upwardly through disengager 14 into adsorption section 11.

The charcoal substantially free of such lighter components passes from rectification section 19 through disengager 20 into a second rectification section 21. In rectification section 21 the charcoal is refluxed with the heavier components in the feed, i. e., $C_3$ and $C_4$ hydrocarbons to effect the desorption of the $C_2$ hydrocarbons, the level of $C_3$, $C_4$ reflux being controlled at a given point within the rectification section 21 by utilization of the temperature rise within the section resulting from the heat of adsorption of the $C_3$ and $C_4$ hydrocarbons. By injecting, or otherwise introducing $C_3$ and $C_4$ hydrocarbons into the rectification section 21 to serve as reflux therein the $C_2$ hydrocarbons are desorbed due to the preferential adsorption of the heavier hydrocarbons, and the desorbed $C_2$ hydrocarbons flow upwardly in the section whereby a portion of the $C_2$ hydrocarbons may be removed from rectification section 21 by means of line 22 controlled by valve 23. The remaining portion of the $C_2$ hydrocarbons are caused to pass upwardly through disengager 20 to insure a continued retention on the charcoal flowing downwardly from rectification section 19 of the heavier hydrocarbon components. In this manner a heart cut is obtained comprising comparatively pure ethane and ethylene.

The charcoal substantially free of the $C_2$ hydrocarbons and lighter gases passes from rectification section 21 through disengager 24 into the stripping zone comprised of the tubular stripping section 25 and the large diameter stripping section 26 disposed beneath the tubular section of the stripping zone. The charcoal passing through disengager 24 passes downwardly through the stripping tubes which are heated externally by means of flue gas introduced by line 27 controlled by valve 28 and removed from the section by line 29 controlled by valve 30. From the tubular section charcoal flows through disengager 31 into the large diameter section 26. Steam is introduced to this section by means of line 32 controlled by valve 33 and is distributed through the section by means of disengager 34. Due to the large diameter of this section in comparison to that of the tubular heating section immediately above, it is possible to introduce quantities of steam greatly in excess of the amounts which could be introduced directly to the tubular heating section. This large quantity of steam flowing countercurrently to the charcoal through section 26 has the effect of stripping the hydrocarbons from the charcoal at temperatures considerably lower than those required if smaller steam rates are employed. The temperatures necessary for effective stripping of the adsorbent, in this case charcoal, are a function not only of the rates of flow of the stripping gas but also of the character of the gaseous components adsorbed on the charcoal. However, in a light hydrocarbon fraction such as employed in this description, the temperature of stripping in a conventional tubular stripping section such as the tubular heating section 25 as shown in the drawing, is in the neighborhood of 500° F. or higher, while by employing the large diameter stripping section in conjunction with the tubular heating section according to my invention, it is possible as a result of higher steam rates to accomplish the same if not more effective stripping at a temperature of from 300° F. to 400° F. Advantages of lower temperature stripping are immediately apparent to those skilled in the art not only in regard to the reduction of the polymerization or other undesirable reaction of the gases adsorbed on the charcoal but also in heating requirements which are appreciable when heating large quantities of charcoal to temperatures as high as 500° F.

A large portion of steam introduced into the large diameter stripping section 26 is removed therefrom by means of line 35 controlled by valve 36 while the remaining portion is caused to flow upwardly through disengager 31 and the tubular heating section 25 and is removed therefrom together with the hydrocarbons desorbed by means of line 37 controlled by valve 38. The large quantity of steam removed from the lower, large diameter section contains only a relatively small amount of comparatively heavy hydrocarbons and as a result a large proportion of the heat may be recovered in an evaporator provided with an aspirator. Such recovery of the sensible heat is impossible from the steam passing through the tubular section of the stripping zone because of the lighter hydrocarbons present therein.

The steam is then removed from the desorbed hydrocarbons obtained from lines 35 and 37 and a portion of these hydrocarbons is reintroduced to rectification section 21 by means of line 39 controlled by valve 40 and function therein as reflux as described above. Alternatively valve 38 on make gas line 37 may be so controlled as to force a portion of the steam hydrocarbon mixture to flow countercurrently to the charcoal through disengager 24 into the rectification section 21 in lieu of the externally introduced reflux. However, I have found the refluxing action to be more effective if the steam is removed from the hydrocarbons prior to introduction of the latter into the rectification section.

The charcoal passing through the stripping zone, i. e., tubular heating section 25 into the large diameter stripping section 26 passes through disengager 34 into the lower portion of the column at which point the rate of flow of the charcoal is most conveniently controlled. Any desired manner of controlling this flow may be employed such as the charcoal feeder 41, as shown, or the like. The charcoal passes through the feeder 41 into the sealing leg 42, the length of which is dependent upon the type of feeder or flow regulator employed. In the drawing a level control 43 is shown whereby the length of the sealing leg may be kept at a minimum by virtue of the fact that the charcoal is maintained in the sealing leg by means of the level control. The charcoal released by the level control 43 flows through transfer line 44 into the gas lift system 45 and by means of gas lift system 45, the charcoal is conveyed to the charcoal gas separator 46 from whence it flows into the hopper 47 at the top of adsorption column 10. A portion of the gas flowing through the gas lift system 45 is allowed to pass countercurrently to the charcoal through transfer line 44 in order to sweep any residual steam from the charcoal from whence it passes via the steam vent line 48 into condenser 49. In condenser 49 the steam is separated from the light gases which are passed through line 59 to the vent 18.

The lift gas flowing into hopper 47 with the charcoal is removed therefrom by means of line 51 and a major proportion is passed via line 52 back to blower 53 which furnishes the energy for the gas lift system 45. Any excess lean gas removed from hopper 47 by line 51 may be passed through valve 54 into the vent line 18. The charcoal from hopper 47 which may still be comparatively warm is passed therefrom into cooler 55 which may be comprised of a tube bundle such as found in the tubular heating section 25. A portion of the lean gas from the adsorption section 11 may be caused to flow countercurrently to the charcoal through the cooling tubes in cooler 55 as described above and thence through hopper 47 and outlet line 51.

Many modifications in the operation and in the design of the adsorption unit may be employed without departing from the present invention which comprises an innovation in the art of selective adsorption whereby two sections are provided in the stripping zone; one a tubular heating section and the other a large diameter principal stripping section. For example it may be desirable to split the operation separating the process of adsorption and stripping into two separate columns wherein, as in the above-described example, the heart cut will be obtained in the initial column by introducing the heavier components obtained in the stripping column as reflux to effect the desorption of the intermediate components. Whereas, the adsorption process is described with reference to a modified procedure wherein a heart cut is obtained from the gaseous feed, it is to be understood that the present invention pertaining to an improved method of stripping is not in any way dependent upon the usage of this modified adsorption process and it is as equally effective when the process involves solely the adsorption of certain components from a gaseous mixture followed by the subsequent recovery of the adsorbed components from the adsorbent by stripping action.

One modification of the adsorption process which may be employed without departure from the principles of the present invention is the use of an elevator type charcoal conveyance rather than a gas lift system as described. In such a case the charcoal flowing through transfer line 44 would be lifted directly by bucket conveyor and deposited at the top of the column, or if two column operation was employed the enriched charcoal flowing from the secondary rectification section or from the adsorption section in the case of simple selective adsorption, would be transferred by an elevator to the top of the stripping column A, which according to the present invention, would be comprised of a tubular heating section and a large diameter principal stripping section.

Whereas, I do not intend to limit the usage of the improved stripping of my invention to charcoal adsorption inasmuch as it finds application in any adsorption process, charcoal is the preferred adsorbent particularly for the separation of hydrocarbon gases. The charcoal employed in the above process is preferably granular, about 10 to 20 mesh although sizes as large as about 4 mesh and as small as about 100 mesh may also be employed. By "charcoal" herein is mean carbon or animal or vegetable charcoal and the like, although an activated form of carbon or charcoal is preferred. After long usage small amounts of highly adsorbable materials may accumulate in the charcoal and hamper its efficiency although by means of the improved stripping as herein disclosed the charcoal will retain its efficiency over considerably longer periods than were heretofore obtainable. However, if such impairment occurs the charcoal may be withdrawn from the column and may be reactivated by high temperature steam treatment.

The process of this invention may be employed for the separation of any mixture of gases containing one or more components which are more readily adsorbable on the charcoal or other adsorbent than another component into two or more fractions depending upon the number of components in the feed and the particular process employed. The degree of adsorbability of gases on charcoal is generally higher for the gases of higher molecular weight. There appears to be a correlation between adsorbability and critical temperature. Thus, gases of low critical temperature, such as hydrogen, nitrogen, oxygen, and carbon monoxide are adsorbed to a lesser degree than gases of higher critical temperature, such as chlorine, sulfur dioxide, hydrogen sulfide, ammonia, nitrous oxide, carbon dioxide and the like. Among the hydrocarbons there is a marked increase in adsorbability with increase in molecular weight. Thus, the process may be employed for the separation of hydrocarbon vapors of higher molecular weight from those of lower molecular weight, as in the adsorption of natural gasoline from natural gas. It may also be used for purification or concentration of readily adsorbable gases, such as those shown from mixtures in which they are contained.

The ratio of charcoal to feed gas required depends on the proportion of rich gas or highly adsorbable components in the feed and the degree of removal desired. As a possible explanation of its action, it appears that charcoal has a definite adsorptive capacity for each component of a gaseous mixture at a given temperature which capacity is affected only slightly by the operating pressure. When a given amount of fresh charcoal is contacted with feed gas, the charcoal adsorbs all components of the gas to at least a slight degree. Its capacity to adsorb the least readily adsorbable constituents of the gas is soon exceeded, however, and thereafter it will not adsorb further amounts of these constituents, but will continue to adsorb the more readily adsorbable components. As it approaches its adsorptive capacity for each more readily adsorbable component, there is a definite displacement of the less readily adsorbable material by the more readily adsorbable material. Thus, for a feed gas containing $C_1$ to $C_4$ hydrocarbons including butadiene, mixed with nitrogen, the use of a high ratio of charcoal to feed gas would result in more complete recovery of total hydrocarbons as make gas, and the use of a limited amount of charcoal would result in the production of a smaller amount of a make gas of higher $C_4$ hydrocarbon or butadiene content.

There are many modifications of the apparatus design which have not been described above which may be employed without departing from the spirit or scope of the present invention which is directed primarily to a method of stripping the enriched adsorbent and not to the mechanics of carrying out the remainder of the adsorption process.

Having described and illustrated my invention, I claim:

1. In a continuous process for the separation of gaseous mixtures by selective adsorption and desorption accomplished by contacting said gaseous mixture with a moving bed of granular solid adsorbent so as to cause adsorption of the more readily adsorbable components, separating the unadsorbed components of said gaseous mixture from the enriched adsorbent and stripping the adsorbed components from the enriched adsorbent, the improvement comprising stripping the adsorbed components from the enriched adsorbent in a plurality of stages whereby in one stage the enriched adsorbent is heated to stripping temperatures and contacted with relatively small amounts of stripping gas and in a subsequent stage the heated and partially stripped adsorbent is contacted with relatively large quantities of the same stripping gas.

2. In a continuous process for the separation of gaseous mixtures by selective adsorption and desorption accomplished by contacting said gaseous mixtures with a moving bed of granular solid adsorbent so as to cause adsorption of the more readily adsorbable components, separating the unadsorbed components of said gaseous mixture from the enriched adsorbent, heating and stripping the adsorbed components from the enriched adsorbent, cooling the stripped adsorbent to a temperature of adsorption, and returning cooled stripped adsorbent to the adsorption stage of the process, the improvement comprising two-stage stripping whereby in the initial stage the enriched adsorbent is heated to stripping temperatures and countercurrently contacted with relatively small amounts of stripping gas and in the second stage the heated and partially stripped adsorbent is contacted with relatively large quantities of the same stripping gas.

3. In a continuous process for the separation of a gaseous mixture into at least three fractions by selective adsorption and desorption accomplished by contacting said mixture with a moving bed of granular solid adsorbent so as to cause adsorption of the more readily adsorbable components of said gaseous mixture by the adsorbent, separating the unadsorbed components from the enriched adsorbent as a primary fraction of said gaseous mixture, desorbing a secondary fraction of the adsorbed component from the enriched adsorbent by contacting said enriched adsorbent with a tertiary fraction of said gaseous mixture, separating the thus desorbed secondary fraction of said gaseous mixture from the adsorbent, stripping the tertiary fraction of said gaseous mixture from the adsorbent, causing a portion of the resultant stripped tertiary fraction to flow countercurrently to the downwardly flowing bed of granular adsorbent to affect the selective desorption of said secondary fraction of said gaseous mixture and the selective adsorption of said tertiary fraction of said gaseous mixture on the downwardly flowing adsorbent, separating the remainder of the stripped tertiary fraction from said adsorbent, and conveying the stripped adsorbent from the stripping zone to a cooling zone from whence it is caused to flow into the said adsorption zone, the improvement comprising two-stage stripping whereby in the initial stage the enriched adsorbent is heated to stripping temperatures and countercurrently contacted with relatively small amounts of stripping gas and in the second stage the heated and partially stripped adsorbent is contacted with relatively large quantities of the same stripping gas.

4. A process according to claim 1 wherein the granular solid adsorbent is activated charcoal.

5. A process according to claim 1 wherein the stripping gas is steam.

6. A continuous process for the separation of gaseous mixtures by selective adsorption and desorption which comprises contacting said gaseous mixture with a moving bed of granular solid adsorbent so as to cause adsorption of the more readily adsorbable components, separating the unadsorbed components of said gaseous mixtures from the enriched adsorbent, heating said enriched adsorbent while contacting with relatively small amounts of stripping gas and subsequently contacting said heated adsorbent with relatively large quantities of the same stripping gas.

7. A continuous process for the separation of a gaseous mixture into at least three fractions which comprises contacting said mixture with a moving bed of granular solid adsorbent contained in an adsorption column so as to cause adsorption of the more readily adsorbable components of said gaseous mixture by the adsorbent, separating the unadsorbed components from the enriched adsorbent as a primary fraction of said gaseous mixture, desorbing a secondary fraction of the adsorbed components from the enriched adsorbent by contacting said enriched adsorbent with a tertiary fraction of said gaseous mixture, separating the thus desorbed secondary fraction of said gaseous mixture from the adsorbent, stripping the tertiary fraction of said gaseous mixture from the adsorbent by heating said enriched adsorbent while it is moving continuously downwardly countercurrently to a comparatively small quantity of stripping gas and subsequently passing said heated adsorbent countercurrently to a comparatively large quantity of stripping gas.

8. A process according to claim 6 in which the solid adsorbent is activated charcoal.

9. A process according to claim 6 in which the stripping gas is steam.

10. A process according to claim 7 in which the adsorbent as activated charcoal.

11. A process according to claim 7 in which stripping gas is steam.

12. A continuous process for the recovery of $C_2$ hydrocarbons from a gaseous mixture which also contains other gaseous hydrocarbons of lower and higher molecular weight than said $C_2$ hydrocarbons as well as non-hydrocarbon gases which comprises contacting said mixture with a moving bed of granular solid adsorbent contained in an adsorption column so as to cause adsorption of the more readily adsorbable components of said gaseous mixture by the adsorbent, separating the unadsorbed components from the enriched adsorbent as a primary fraction of said gaseous mixture, said fraction comprising predominantly lower molecular weight hydrocarbons than said $C_2$ hydrocarbons as well as non-hydrocarbon gases, desorbing the $C_2$ hydrocarbons as a secondary fraction from the enriched adsorbent by contacting said enriched adsorbent with a tertiary fraction of said gaseous mixture, said tertiary fraction comprising heavier molecular weight hydrocarbons than said $C_2$ hydrocarbons, separating the thus desorbed secondary fraction of said gaseous mixture from the adsorbent and removing said secondary fraction from said adsorption column, stripping the tertiary fraction of said gaseous mixture from the adsorbent by heating said enriched adsorbent while it is moving continuously downward countercurrently to a stream of stripping gas passing therethrough and subsequently passing said heated adsorbent countercurrently to a relatively large quantity of stripping gas.

13. A process for stripping adsorbed material from a solid adsorbent which comprises passing said adsorbent successively through two stages of a stripping zone, countercurrently contacting said adsorbent in the first stage with a relatively small amount of a stripping gas while simultaneously subjecting it to indirect heating so as to strip a portion of said adsorbed material therefrom, and contacting the resulting adsorbent in the second stage with a relatively large amount of the same stripping gas in the absence of indirect heating so as to strip additional adsorbed material therefrom.

14. A process according to claim 13 in which the stripping gas flows countercurrently to the adsorbent in both stages.

15. A process according to claim 13 in which the portion of adsorbed material stripped in the second stage is withdrawn separately from the portion stripped in the first stage.

16. A process according to claim 13 in which the stripping gas is steam.

17. A process according to claim 13 in which the second stage is operated at a lower maximum temperature than the first stage.

18. A process according to claim 13 in which hot flue gases are employed to supply the indirect heating, and a separate stream of steam is employed as the stripping gas.

19. An apparatus for stripping adsorbed material from a solid adsorbent which comprises a vertical vessel having a substantially uniform cross sectional area and containing an upper stripping section and a lower stripping section, gas disengager means at the top of the upper section to permit said adsorbent to pass continuously downward by gravity into said section while separately removing gas therefrom, means for indirectly heating the adsorbent in the upper section, gas disengager means between the upper and lower sections to permit said adsorbent to pass continuously downward by gravity therethrough while removing gas therefrom, and gas disengager means at the bottom of the lower section to permit said adsorbent to pass continuously downward by gravity therethrough while introducing stripping gas therein, each of said gas disengager means comprising a horizontal plate extending over the entire cross sectional area of the vessel and having numerous perforations to permit substantially uniform flow of solids across the entire cross sectional area.

20. An apparatus according to claim 19 in which each perforation is equipped with an open tube depending from the plate.

21. An apparatus for the separation of gaseous mixtures by selective adsorption and desorption in the moving bed of granular adsorbent which comprises a vertical adsorption column of substantially all uniform cross section provided with a cooling section, an adsorption section, and a stripping section, said stripping section comprising an upper stripping section and a lower stripping section, gas disengager means at the top of the upper section to permit said adsorbent to pass continuously downward by gravity into said section while separately removing gas therefrom, means for indirectly heating the adsorbent in the upper section, gas disengager means between the upper and lower sections to permit said adsorbent to pass continuously downward by gravity therethrough while removing gas therefrom, and gas disengager means at the bottom of the lower section to permit said adsorbent to pass continuously downward by gravity therethrough while introducing stripping gas therein, each of said gas disengager means comprising a horizontal plate extending over the entire cross sectional area of the vessel and having numerous perforations to permit substantially uniform flow of solids across the entire cross sectional area.

22. An apparatus for the separation of a gaseous mixture by selective adsorption and desorption in a moving bed of granular adsorbent which comprises a vertical adsorption column of substantially uniform cross section provided with a cooling section, an adsorption section, at least two rectification sections, and a stripping section, said stripping section comprising an upper stripping section and a lower stripping section, gas disengager means at the top of the upper section to permit said adsorbent to pass continuously downward by gravity into said section while separately removing gas therefrom, means for indirectly heating the adsorbent in the upper section, gas disengager means between the upper and lower sections to permit said adsorbent to pass continuously downward by gravity therethrough while removing gas therefrom, and gas disengager means at the bottom of the lower section to permit said adsorbent to pass continuously downward by gravity therethrough while introducing stripping gas therein, each of said gas disengager means comprising a horizontal plate extending over the entire cross sectional area of the vessel and having numerous perforations to permit substantially uniform flow of solids across the entire cross sectional area.

DONALD H. IMHOFF.

REFERENCES CITED

The following references are of record in the file of this patent:

UNITED STATES PATENTS

| Number | Name | Date |
|---|---|---|
| 1,422,007 | Soddy | July 4, 1922 |
| 1,617,960 | Muller | Feb. 12, 1927 |
| 1,825,707 | Wagner, Jr. | Oct. 6, 1931 |
| 1,836,301 | Bechthold | Dec. 15, 1931 |
| 1,872,080 | Harris | Aug. 16, 1932 |